Nov. 7, 1961   C. W. SINCLAIR ET AL   3,007,553
BRAKE DRUM
Filed May 19, 1958   2 Sheets-Sheet 2

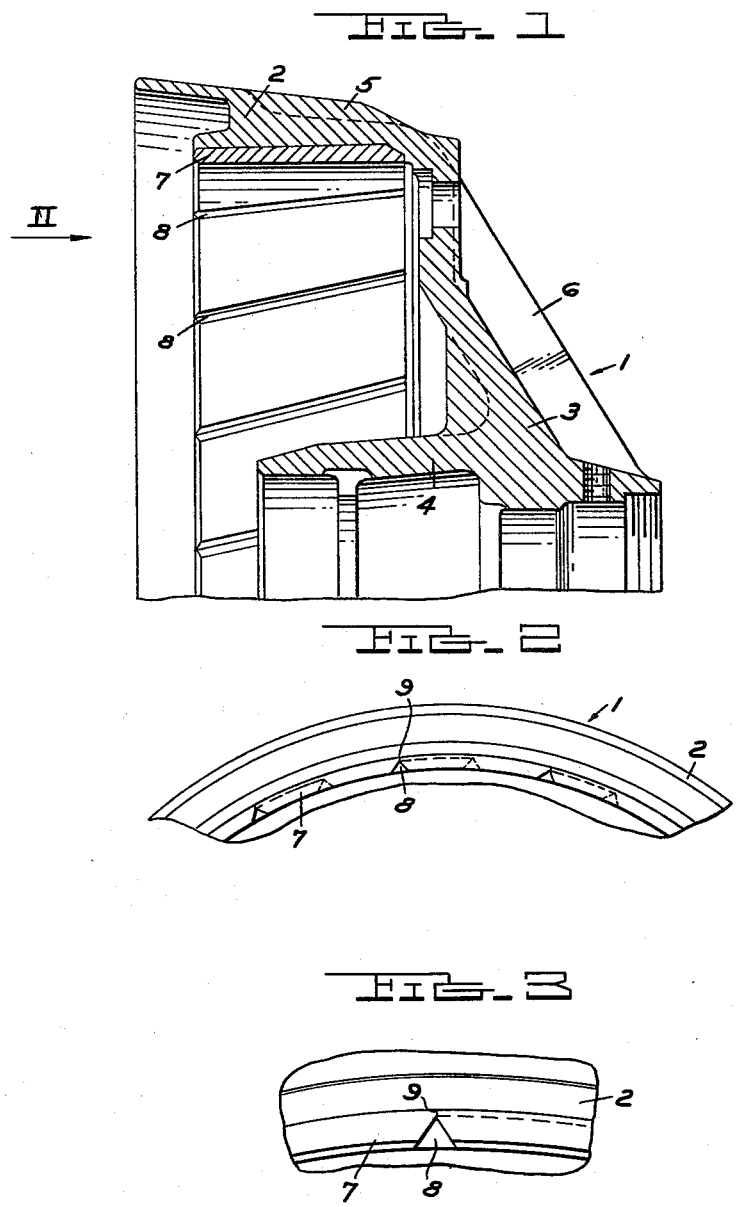

INVENTORS
CHARLES W. SINCLAIR
RUPERT L. ATKIN
BY
Whittemore, Hulbert & Belknap
ATTORNEYS United States Patent Office 3,007,553
Patented Nov. 7, 1961

3,007,553
BRAKE DRUM
Charles W. Sinclair, Detroit, and Rupert L. Atkin, Grosse Pointe Woods, Mich., assignors to Kelsey-Hayes Company, Detroit, Mich., a corporation of Delaware
Filed May 19, 1958, Ser. No. 736,073
1 Claim. (Cl. 188—218)

This invention relates to brake drums and refers more particularly to brake drums for motor vehicle wheels.

The invention has for one of its objects to provide a brake drum composed of parts having different coefficients of thermal expansion, the materials being bonded together and constructed to substantially preserve the bond despite changes in temperature over a wide range.

The invention has for another object to provide a brake drum comprising a shell having a flange and a liner bonded to the flange and having a smaller coefficient of thermal expansion than the flange, the liner being formed to provide lines of weakness so that it will crack in a controlled or predetermined pattern upon unequal expansion of the liner and flange, whereby the bond between the liner and flange will remain intact.

Other objects and features of the invention will become apparent as the description proceeds, especially when taken in conjunction with the accompanying drawings, illustrating preferred embodiments of the invention, wherein:

FIG. 1 is a radial section of a brake drum embodying the invention.

FIG. 2 is a fragmentary elevation in the direction of the arrow II in FIG. 1.

FIG. 3 is an enlargement of a portion of FIG. 2.

Figure 4:
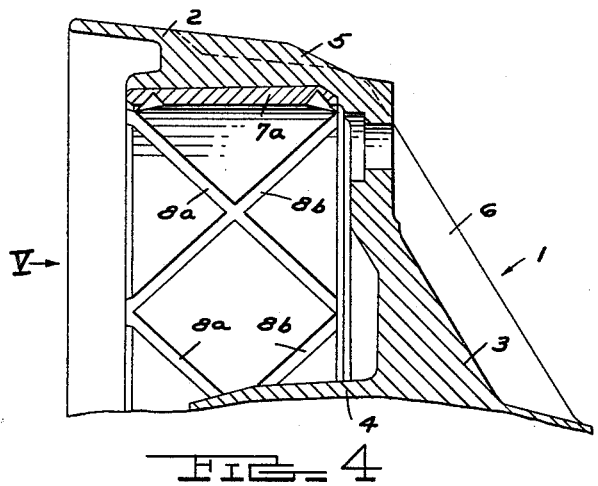
FIG. 4 is similar to FIG. 1 and illustrates a modification.

Referring to FIGS. 1, 2 and 3, the brake drum 1 comprises a cast element in the form of a shell having the integral annular flange 2 and web 3. The shell is cast integrally with the hub 4 of aluminum or magnesium, which are relatively light in weight and have high heat transfer characteristics. While aluminum or magnesium is preferred, other materials having similar characteristics may be employed. The annular flange 2 is formed with a series of circumferentially spaced heat dissipating ribs 5 cast integrally with the flange. The web 4 has radial ribs 6 on the outboard side, cast integrally with the web and hub.

7 is an annular cast iron liner bonded to the inner surface of the flange 2 for engagement by a suitable friction device, not shown.

The brake drum shell and hub may be formed by casting in a sand or permanent mold, or by die casting, for example. Preferably the liner 7 is placed in the mold prior to casting and the shell is cast around the liner to obtain a molecular bond between the liner and the shell on all contacting surfaces. The molecular bond enables rapid transfer of heat from the liner to the shell for dissipation to the surrounding air. Thus the liner is bonded to the flange 2 throughout the full 360° of contact. The surfaces of the liner may be initially treated to promote bonding by a process known in the art and described in U.S. Patent No. 2,396,730.

According to this process, when an aluminum shell is to be cast, the radially outer surface of the liner is first cleaned to remove all foreign matter which would interfere with the formation of a strong bond. The remaining surface area of the liner should be covered with a suitable stop-off preparation so that it will not be acted upon during the process. The liner is then dipped in a bath of molten aluminum for a sufficient time and at a proper temperature to cause the aluminum to alloy with the ferrous metal of the liner and form a thin iron-aluminum alloy bond on the outer surface of the liner. The liner is then quenched in a molten bath of aluminum and silicon to arrest the formation of the iron-aluminum alloy bond on the surface of the liner. After quenching, the liner, while still wetted by molten aluminum, is transferred to a mold where molten aluminum is poured to cast the brake drum shell and hub. The flange 2 is cast on the wet aluminum skin overlying the thin iron-aluminum alloy on the liner and a strong molecular bond is obtained. In some instances the quench may be omitted and the liner transferred immediately from the first bath to the casting mold.

A similar process may be employed for obtaining a molecular bond between a magnesium brake drum shell and cast iron liner.

The liner is formed on its inner surface with a plurality of parallel diagonally extending grooves 8 which are spaced apart equal distances about the circumference of the liner and which extend from edge to edge of the liner. These grooves are preferably formed in the liner before casting of the drum shell and hub and are relatively narrow, amounting to a very small fraction of the inner braking surface of the liner. The bottoms of the grooves are disposed close to the outer bonded surface of the liner and provide the liner with lines of reduced cross-section coextensive with and along the bottoms of the grooves.

The aluminum or magnesium shell has a higher coefficient of thermal expansion than the cast iron liner and is more ductile. Therefore when the brake drum heats up due to an application of the brakes, the shell will expand more than the cast iron liner, tending to pull away from the liner and destroy the bond. The lines of reduced cross-section in the liner are lines of weakness so that before the flange can pull away from the liner, the liner will crack along such lines of weakness, that is at the bottoms of the grooves. The cracks that will develop in the liner are indicated at 9. The bond of the flange to the liner segments between cracks 9 will remain intact since the liner segments can expand with the flange independently of each other.

Foreign matter such as particles which may work loose from the friction device are trapped in the grooves and thrown from the ends of the grooves during rotation of the drum.

Figure 5:
FIG. 5 is a fragmentary elevation in the direction of arrow V in FIG. 4.

FIGS. 4 and 5 show a modification in which the liner 7a is formed with grooves 8a and 8b on its inner surface. The grooves 8a are parallel and extend diagonally in equally spaced relation about the circumference of the liner and from edge to edge thereof, and grooves 8b are parallel and extend diagonally in equally spaced relation about the circumference of the liner and from edge to edge thereof. The grooves 8a and 8b are arranged in crossing pairs and are of substantially the same depth and width as grooves 8 previously described. Lines of reduced cross-section or weakness in the liner are coextensive with and extend along the bottoms of the grooves. Hence before the flange can pull away from the liner when the drum heats up, the liner will crack along the lines of weakness at the bottoms of the grooves, as indicated at 9, and the bond of the flange to the liner segments between cracks 9 will remain intact. Otherwise the construction of FIGS. 4 and 5 is like that of FIGS. 1–3.

Figure 6:
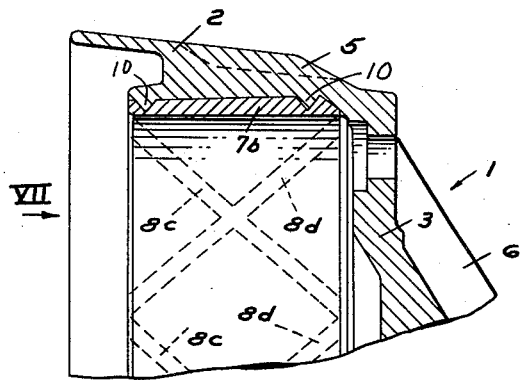
FIG. 6 is similar to FIG. 1 and shows another modification.
Figure 7:
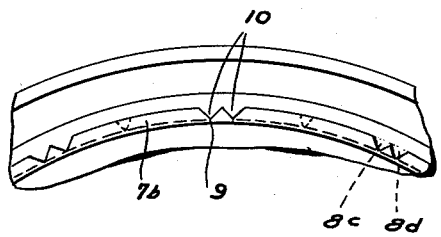
FIG. 7 is a fragmentary elevation in the direction of the arrow VII in FIG. 6.

FIGS. 6 and 7 show a further modification in which the liner 7b is smooth on its inner braking surface and is formed with grooves 8c and 8d in its outer bonded surface. The grooves 8c are parallel and extend diagonally in equally spaced relation about the circumference of the liner and from edge to edge thereof, and grooves 8d are parallel and extend diagonally in equally spaced relation about the circumference of the liner and from edge to edge thereof. The grooves 8c and 8d are arranged in crossing pairs and are of substantially the same depth and width as grooves 8 previously described. Lines of reduced cross-section or weakness in the liner are coextensive with and extend along the bottoms of the grooves.

The grooves 8c and 8d are formed in the liner before it is placed in the mold and the shell cast around it. Hence, the molten shell metal will flow into the grooves during casting forming projections 10 which provide an interlock between the cast shell flange and liner to assist the molecular bond in anchoring the two against relative movement. The molecular bond extends over all contacting surfaces of the liner and flange, including the projections 10 and grooves 8c and 8d.

When the drum heats up, the shell will expand more than the cast iron liner. However before the flange can pull away from the liner, the liner will crack along the lines of weakness at the bottoms of the grooves, as indicated at 9, and the bond of the flange to the liner segments between cracks 9 will remain intact. While the cracks 9 extend to the braking surface of the liner, this will not materially affect the braking action.

What we claim as our invention is:

A brake drum comprising a shell formed of a relatively lightweight material having high heat transfer characteristics, said shell having an endless annular flange, an endless annular liner within and concentric with said flange and molecularly bonded thereto throughout a full 360° of contact, said liner having a smaller coefficient of thermal expansion and less ductility than said flange, and elongated circumferentially spaced transverse grooves in the outer bonded surface of said liner, said grooves extending from one edge of said liner to the other and being of a depth exceeding one-half the thickness of said liner to provide an elongated relatively thin web of liner material at the base of and coextensive with each groove, said webs integrally joining the portions of said liner between said grooves and providing lines of weakness at the bases of and coextensive with said grooves so that said liner will crack along said lines of weakness as a result of unequal expansion of said liner and flange before said flange can expand away from said liner and thereby destroy the bond between said flange and said portions of said liner between said grooves, the material of said flange extending into said grooves providing a mechanical interlock between said flange and liner.

References Cited in the file of this patent

UNITED STATES PATENTS

| | | |
|---|---|---|
| 1,686,346 | Sanford | Oct. 2, 1928 |
| 1,727,486 | Sauzedde | Sept. 10, 1929 |
| 1,974,905 | Walker | Sept. 25, 1934 |
| 1,998,666 | Frank | Apr. 23, 1935 |
| 1,998,709 | Dake | Apr. 23, 1935 |
| 2,115,980 | Sinclair | May 3, 1938 |
| 2,396,730 | Whitfield et al. | Mar. 19, 1946 |
| 2,793,427 | Marvin | May 28, 1957 |
| 2,840,195 | Holton | June 24, 1958 |